United States Patent [19]
Inoue et al.

[11] Patent Number: 5,532,994
[45] Date of Patent: Jul. 2, 1996

[54] DISK STORAGE HAVING NOTCHED FRONT BEZEL

[75] Inventors: Kazuhiko Inoue, Houya; Takashi Watanabe, Ichikawa, both of Japan

[73] Assignee: TEAC Corporation, Japan

[21] Appl. No.: 147,003

[22] Filed: Nov. 2, 1993

Related U.S. Application Data

[63] Continuation of Ser. No. 842,467, Feb. 27, 1992, abandoned.

[30]     Foreign Application Priority Data

Mar. 29, 1991 [JP] Japan ................... 3-20170 U

[51] Int. Cl.⁶ ........................... G11B 17/04; G11B 33/02
[52] U.S. Cl. ................. 369/77.2; 360/99.06; 369/77.1
[58] Field of Search ................. 360/99.06, 97.01; 369/77.1, 77.2

[56]     References Cited

U.S. PATENT DOCUMENTS

| | | | |
|---|---|---|---|
| 4,724,498 | 2/1988 | Takikawa et al. | 360/99.06 |
| 4,736,356 | 4/1988 | Konshak | 369/77.2 |
| 5,005,089 | 4/1991 | Thanos et al. | 360/77.08 |
| 5,105,414 | 4/1992 | Funabashi et al. | 369/77.1 |
| 5,126,899 | 6/1992 | Kanazawa | 369/77.2 |

FOREIGN PATENT DOCUMENTS

| | | | |
|---|---|---|---|
| 58-60453 | 4/1983 | Japan | 369/77.2 |
| 62-195295 | 12/1987 | Japan . | |
| 1-133286 | 9/1989 | Japan . | |
| 1133286 | 9/1989 | Japan . | |
| 3110698 | 3/1991 | Japan . | |
| 4-6895 | 1/1992 | Japan . | |
| 124579 | 12/1989 | Taiwan . | |

OTHER PUBLICATIONS

Asian Sources Computer Products, Jan., 1989.

Primary Examiner—John H. Wolff
Assistant Examiner—David D. Davis
Attorney, Agent, or Firm—Andrus, Sceales, Starke & Sawall

[57]     ABSTRACT

A thin disk storage to and from which a disk cartridge accommodating a disk is inserted and ejected. A front bezel of the disk storage includes a concave portion having a concave shape when viewed from a direction perpendicular to a recording surface of the disk of the disk cartridge inserted into the disk storage, and includes also an opening via which the disk cartridge is inserted into the disk storage. Due to the concave shape of the concave portion a finger of an operator can easily move the disk cartridge to a position where the disk cartridge can be loaded.

7 Claims, 3 Drawing Sheets

DISK STORAGE HAVING NOTCHED FRONT BEZEL

This application is a continuation application U.S. patent application Ser. No. 07/842,467 filed Feb. 27, 1992, now abandoned.

BACKGROUND OF THE INVENTION

The present invention relates generally to disk storages, and more particularly to a front bezel used for a thin disk storage to and from which a disk is inserted and ejected.

In a conventional disk storage, shown in FIG. 1, a disk cartridge 4 accommodating a 3.5 in. floppy disk (not shown) therein is manually inserted into a housing 2 via an opening 3a of a front bezel 3 attached to the housing 2. To completely insert the disk cartridge 4 into the housing 2, a concave portion 3c, into which a finger 30 pressing a back end surface 4a of the disk cartridge 4 is to be inserted, is provided with the front bezel 3. When the finger 30 pressing the back end surface 4a is inserted into the concave portion 3c, the disk cartridge 4 is inserted into the housing 2 across a front surface 3b of the front bezel 3. When the disk cartridge 4 is moved, by a finger 30, to a first position inside the housing 2, the disk cartridge 4 is moved to and loaded at the second position inside the housing 2 by a disk loading mechanism (not shown). When the disk cartridge 4 is loaded at the second position, the head (not shown) accommodated in the housing 2 records information on the disk in the disk cartridge 4 or reproduces information therefrom. An eject button 5 is then manually pressed to eject the disk cartridge 4 from the housing 2.

However, responsive to recent thinner disk storages, the thickness $T_2$ of the front bezel 3 and the thickness $T_1$ of the concave portion 3c have become accordingly smaller. Thus the finger 30 is hard to insert into the concave portion 3c, and is often prevented from being inserted into the concave portion 3c by parts 3b and $3b_{-2}$ of the front surface 3b. Consequently, the disk cartridge 4 cannot be moved to the first position and thus be loaded at the second position. Incidentally if the thickness $T_2$ is greater than 25.4 mm, the finger 30 can be easily inserted into the concave portion 30.

SUMMARY OF THE INVENTION

Accordingly, it is a general object of the present invention to provide a novel and useful disk storage in which the above disadvantage is eliminated.

Another more specific object of the present invention is to provide a thin disk storage into which a disk cartridge is easily and surely inserted.

With the foregoing in mind, the disk storage according to the present invention comprises a housing, disk loading means, accommodated in the housing, for moving a disk cartridge accommodating a disk therein from a first position to a second position in the housing, in order to load the disk cartridge at the second position, recording/reproducing means, accommodated in the housing, for recording information on a recording surface of the disk of the disk cartridge loaded at the second position and for reproducing information therefrom, and a front bezel, attached to the housing, which includes a concave portion having a concave shape when viewed from a direction perpendicular to the recording surface of the disk of the disk cartridge inserted into said housing, and an opening via which the disk cartridge is inserted into the housing, a finger of an operator which moves the disk cartridge to the first position being inserted into the concave portion.

According to the present invention, due to the concave shape of the concave portion, the finger pressing a back end surface of the disk cartridge can be surely inserted into the concave portion to move the disk cartridge to the first position. The disk cartridge located at the first position is moved to the second position by the disk loading means.

Other objects and further features of the present invention will become apparent from the detailed description when read in conjunction with the accompanying drawings.

DETAILED DESCRIPTION OF THE PREFERRED EMBODIMENTS

Figure 1:
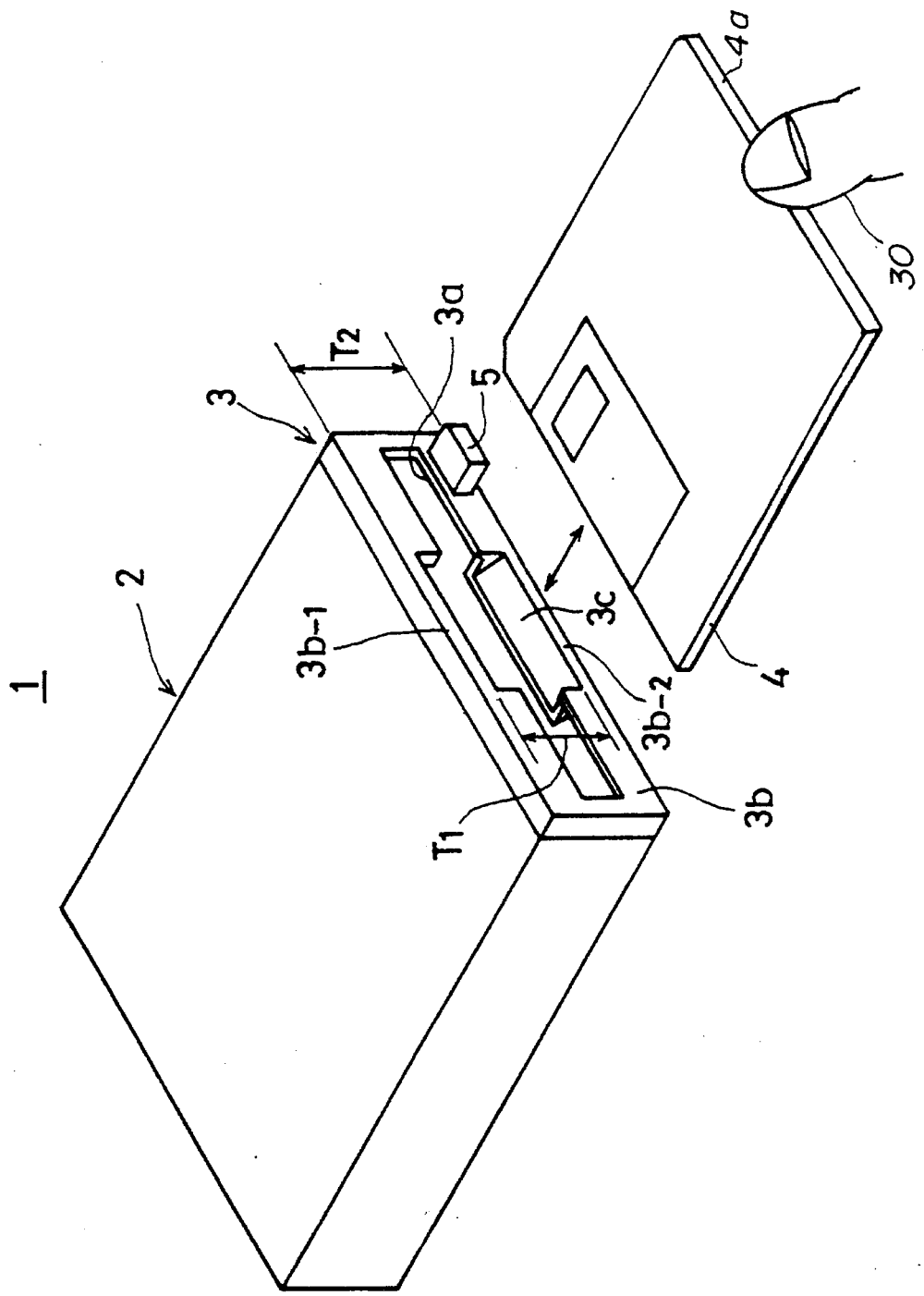
FIG. 1 shows an exterior perspective view of a conventional disk storage.
Figure 2:
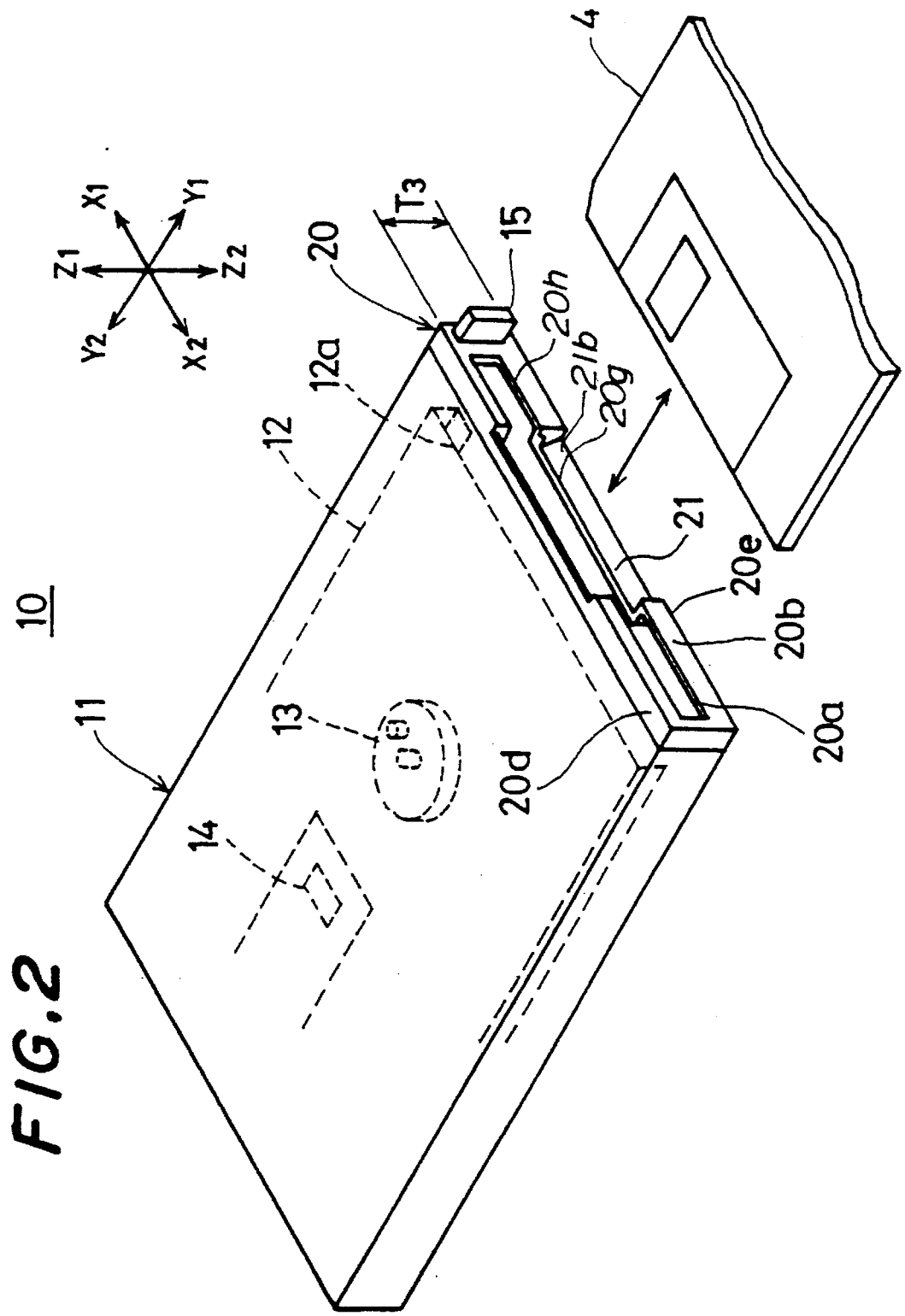
FIG. 2 shows an exterior perspective view of a disk storage according to the present invention.

A disk storage 10 according to the present invention comprises, as shown in FIG. 2, a housing 11 and a front bezel 20 attached to a front surface of the housing 11. The housing 11 includes a frame made by bending a steel plate, a disk loading mechanism 12, a disk driving motor 13, a head 14, circuits, etc. The disk loading mechanism 12, a disk driving motor 13, a head 14, circuits, etc. are fixed on the frame. The disk cartridge 4 is inserted into an insertion opening 12a of the disk loading mechanism 12. The disk loading mechanism 12 moves the inserted disk cartridge 4 to a predetermined position to load it thereat. The disk driving motor 13 rotates a disk in the loaded disk cartridge 4. The head 14 records information on the rotated disk and/or reproduces information therefrom. The circuits control operations of the disk driving motor 13 and head 14, and process the above information.

The front bezel 20, made by molding resin, has the thickness $T_3$. The front bezel 20 has an opening 20a and a concave portion 21. In addition, an eject button 15 projects from the front bezel 20.

The disk cartridge 4 is inserted into the housing 11 via the opening 20 whose longitudinal direction is parallel to a direction $X_1X_2$. The eject button 15 is aligned with the longitudinal direction of the opening 20a, and the thickness $T_3$ is less than the thickness $T_2$ of the conventional disk storage 1 in which the eject button 5 is located below the opening 3a. The opening 20a is closed by a lid (not shown) which prevents dust from being entering through the opening 20a when a disk cartridge 4 is not inserted. The opening 20a has a shape corresponding to the insertion opening 12a of the disk loading mechanism 12 so as to guide the disk cartridge 4 to the disk loading mechanism 12.

Figure 3:
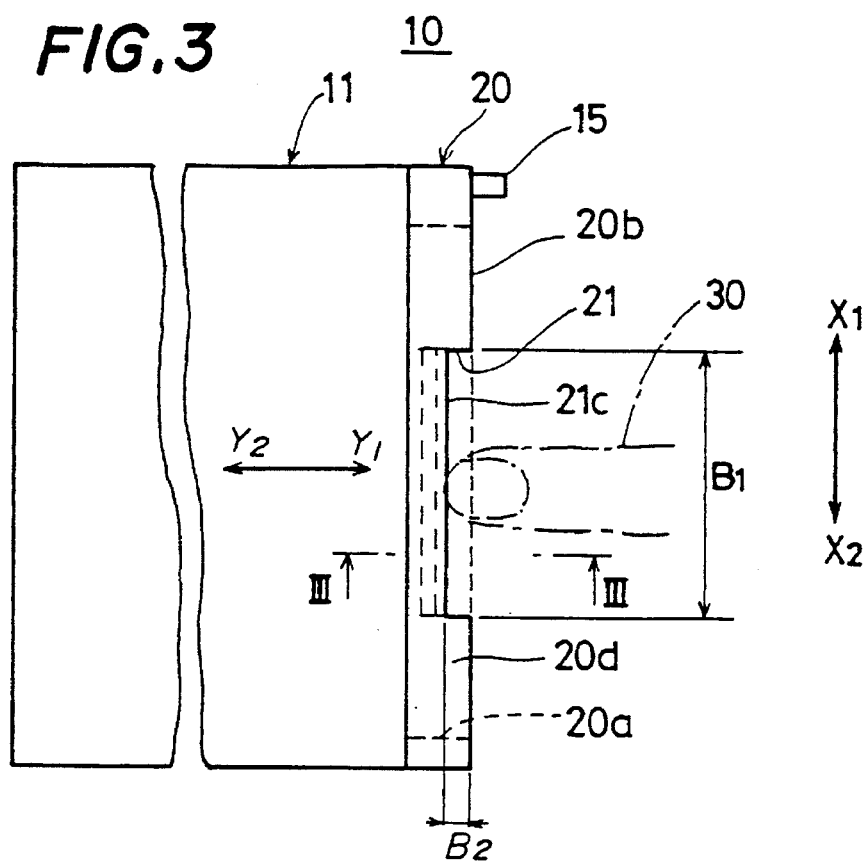
FIG. 3 shows a plane view of the disk storage shown in FIG. 2 viewed from a direction $Z_2$.

The concave portion 21 is formed, as shown in FIGS. 2 and 3, by cutting out near the center of a front surface 20b of the front bezel 20.

As shown in FIG. 3, since the concave portion 21 has a width $B_1$ wider than the finger 30, the finger 30 can be easily inserted into the concave portion 21. Incidentally, the width $B_1$ may be changed only if the front bezel 20 maintains a predetermined mechanical strength.

In addition, as shown in FIG. 3, since the concave portion 21 recedes from the front surface 20b by a distance $B_2$ in a direction $Y_2$ perpendicular to a recording surface of the disk, the finger 30 can go across the front surface 20b in the direction $Y_2$. Incidentally, the distance $B_2$ may be changed only if the front bezel 20 maintains predetermined mechanical strength.

Figure 4:
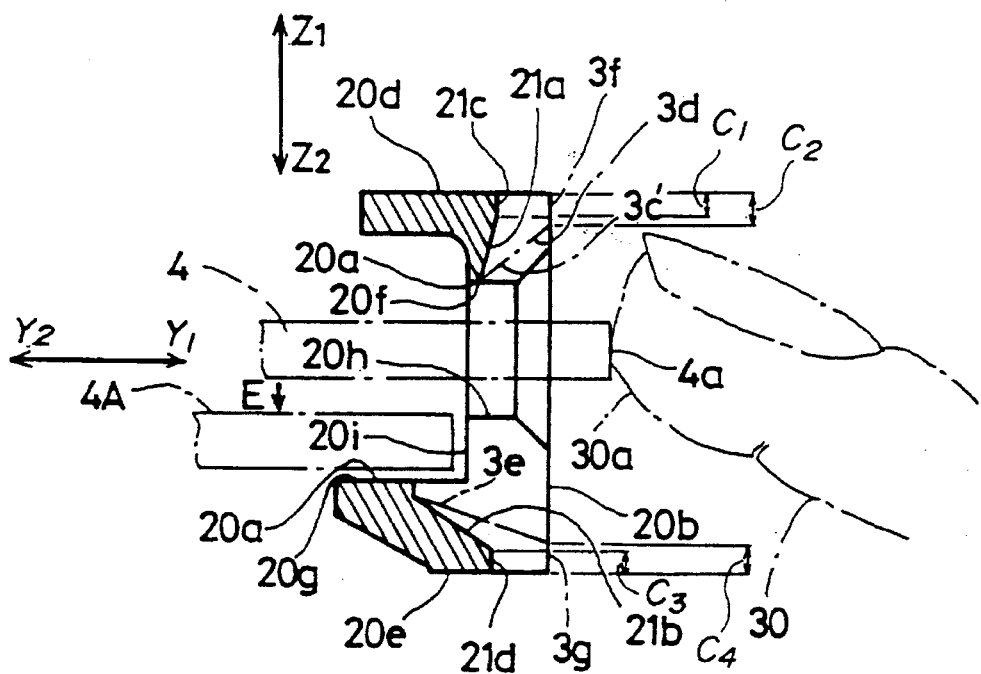
FIG. 4 shows a cross-sectional view taken along a line III—III shown in FIG. 3.

Moreover, as indicated by oblique lines shown in FIG. 4, the concave portion 21 is defined by outlines of surfaces 20f, 21a, 21c and 20d and those of surfaces 20g, 21b, 21d, and 20e. (Notice that the eject button 15 is not depicted in FIG. 4.) The surfaces 21a and 21b are declined, so that the concave portion 21 spreads toward a direction $Y_1$, and they are respectively chamferred near the upper surface 20d and lower surface 20e to form surfaces 21c and 21d. The surfaces 20f and 20g define the opening 20a inside the concave part 21. The surface 20g is located farther along the direction $Y_2$ than the surface 20f. The surface 20g is located below the surface 20h which defines the opening 20a outside the concave portion 21. Thus, since the opening 20a inside the concave portion 21 is wider in the direction $Z_1Z_2$ than that outside the concave portion 21, the finger 30 can easily press the disk cartridge 4. Note, in FIG. 4, one-dot lines show inclined surfaces 3d and 3e of the conventional front bezel 3 having the thickness $T_3$. The inclined surfaces 3d and 3e extend to the front surface 3b of the front bezel 3 and are chamferred to form surfaces 3f and 3g. That is, the concave portion 3c' of the conventional front bezel 3 is defined by outlines of surfaces 20f, 3d, 3f and 20d, and those of surfaces 20g, 3e, 3g and 20e. Since the width $C_1$ of the surface 21c is smaller than the width $C_2$ of the surface 3f and the width $C_3$ of the surface 21d is smaller than the width $C_4$ of the surface 3g, the concave portion 21 of the disk storage 10 according to the present invention is larger than the concave portion 3c' of the conventional disk storage. Therefore, the finger 30 pressing the back end surface 4a of the disk cartridge 4 can go farther in the direction $Y_2$. Since the surface 20g defining the opening 20a recedes further in the direction $Y_2$ than the surface 20f, the finger 30 can easily move in the direction $Y_2$. Incidentally, the surface 21a and/or the surface 21b may be formed vertically to the direction $Y_2$, only if the front bezel 20 maintains a predetermined mechanical strength.

When the disk cartridge 4 is inserted into the disk storage 10, an operator presses and move the disk cartridge 4, with the finger 30, in the direction $Y_2$, and inserts it into the insertion opening 12a of the disk loading mechanism 12 via the concave portion 21 and the opening 20a. When the back end surface 4a of the disk cartridge 4 goes across an inner surface 20i of the front bezel 20, a stopper of the disk loading mechanism 12 is released and thus the disk cartridge 4 descends in the direction $Z_2$ to be loaded so that the upper surface thereof can be located at a position 4A. The distance $B_2$ shown in FIG. 3 is sufficiently long so that the back end surface 4a of the disk cartridge 4 can go across the inner surface 20i of the front bezel 20.

Thus, according to the present invention, the concave portion of the front bezel has a concave shape when viewed from a direction perpendicular to the recording surface of the disk, the finger of the operator can move more deeply the disk cartridge across the front surface of the front bezel. The present invention is especially useful for a thin disk storage. Incidentally, the disk cartridge may be a magnetic disk cartridge, CD-ROM cartridge, optical disk cartridge, magneto-optical disk cartridge etc.

Further the present invention is not limited to these preferred embodiments, and various variations and modifications may be made without departing from the scope of the present invention.

What is claimed is:

1. A disk storage comprising:

a housing (11);

disk loading means, accommodated in said housing (11), for translating a disk cartridge (4) accommodating a disk therein from a first position to a second position subadjacent and parallel to the first position in said housing (11), in order to load the disk cartridge (4) at the second position;

recording/reproducing means, accommodated in said housing (11), for recording information on a recording surface of the disk of the disk cartridge (4) loaded at the second position, and for reproducing information therefrom;

a front bezel (20) having a top surface (20d), an opposed bottom surface (20e) parallel to said top surface (20d), a first surface (20b) which comprises a front surface of said disk storage, and a rearward surface (20i) having a shoulder therein for retaining the disk cartridge (4) in the second position, the front bezel (20) being attached to said housing and including an opening (20a) having a longitudinal direction extending parallel to said top and bottom surfaces via which the disk cartridge (4) is inserted in said housing (11), the bezel (20) further including a concave portion (21) having a concave shape spanning from said top surface to said bottom surface, the concave portion being defined by a second surface (21a, 21c) in the bezel positioned in the center of said opening (20a) along said longitudinal direction of said opening (20a) and between said opening (20a) and said top surface (20d), a third surface (21d) in the bezel (20) positioned in the center of said opening (20a) along said longitudinal direction of said opening (20a) and between said opening (20a) and said bottom surface (20e), and a fourth surface (20b) in the bezel extending at a slant from said third surface (21d) inwardly of said housing (11), said second surface (21a, 21c) and said third surface being situated inwardly of said first surface (20b) and outwardly of said shoulder, and said fourth surface (21b) having an innermost end situated inwardly of said shoulder whereby said concave portion facilitates complete insertion of the disk cartridge (4) into said opening (20a) So as to allow the disk cartridge (4) to translate from the first position to the second position without interference from said shoulder;

a singular, isolated eject button (15) that projects from said front bezel (20) at a position beyond the width of the opening (20a) of said front bezel (20) and in alignment with said longitudinal direction of the opening (20a) of said front bezel (20); and an eject mechanism coupled to said eject button that ejects the disk cartridge (4) loaded at the second position from said housing (11) when said eject button (15) is pressed.

2. A disk storage according to claim 1, wherein said concave portion is located near a center of said front bezel.

3. A disk storage according to claim 1, wherein said recording/reproducing means comprises:

a disk driving motor that rotates the disk; and a head that records the information on the recording surface of the disk and reproduces the information therefrom while the disk is rotated by the disk driving motor.

4. A disk storage according to claim 1, wherein said disk is a magnetic disk.

5. A disk storage according to claim 1, wherein said disk is a magneto-optical disk.

6. A disk storage according to claim 1, wherein said disk is an optical disk.

7. A disk storage according to claim 1, wherein each of the widths between said opening and said top surface of said front bezel and between said opening and said bottom surface of said front bezel is equal to or smaller than a width of said opening.

* * * * *